No. 849,473. PATENTED APR. 9, 1907.
E. GUESS.
CASH CHECKING MACHINE.
APPLICATION FILED JUNE 20, 1904.

WITNESSES:
G. V. Symes.
A. Millward Flack.

INVENTOR.
E. Guess.
Robert V. Phillips.
Attorney.

No. 849,473.
PATENTED APR. 9, 1907.
E. GUESS.
CASH CHECKING MACHINE.
APPLICATION FILED JUNE 20, 1904.

WITNESSES:
INVENTOR.
E. Guess.

No. 849,473. PATENTED APR. 9, 1907.
E. GUESS.
CASH CHECKING MACHINE.
APPLICATION FILED JUNE 20, 1904.

WITNESSES: INVENTOR.
E. Guess.

No. 849,473. PATENTED APR. 9, 1907.
E. GUESS.
CASH CHECKING MACHINE.
APPLICATION FILED JUNE 20, 1904.

WITNESSES:
G. V. Symes.
A. Millward Flack.

INVENTOR.
E. Guess.
Per Robert E. Phillips
Attorney.

No. 849,473. PATENTED APR. 9, 1907.
E. GUESS.
CASH CHECKING MACHINE.
APPLICATION FILED JUNE 20, 1904.

WITNESSES:
G. V. Symes.
A. Midward Flack.

INVENTOR.
E. Guess.
Per Robert O. Phillips
Attorney.

No. 849,473. PATENTED APR. 9, 1907.
E. GUESS.
CASH CHECKING MACHINE.
APPLICATION FILED JUNE 20, 1904.

WITNESSES:
INVENTOR.
E. Guess.

No. 849,473. PATENTED APR. 9, 1907.
E. GUESS.
CASH CHECKING MACHINE.
APPLICATION FILED JUNE 20, 1904.

WITNESSES:
INVENTOR.
E. Guess.

UNITED STATES PATENT OFFICE.

EDGAR GUESS, OF CLAPHAM, ENGLAND.

CASH-CHECKING MACHINE.

No. 849,473.  Specification of Letters Patent.  Patented April 9, 1907.

Application filed June 20, 1904. Serial No. 213,334.

*To all whom it may concern:*

Be it known that I, EDGAR GUESS, a subject of the King of Great Britain, and a resident of 31 Tasman road, Clapham, in the county of Surrey, England, have invented a certain new and useful Improvement in and connected with Cash-Checking Machines, (for which I have applied for Letters Patent in Great Britain, No. 14,062, dated June 24, 1903,) of which the following is a specification.

The present invention relates to improvements in and connected with electrical cash-checking machines, the objects being the prevention of fraud and recording the total amount of cash registered as having been received.

The invention comprises, essentially, a switchboard with a series of levers or knobs each one of which represents a different value equivalent to one or more cash units, a series of registering-dials in electrical connection with the switchboard, so that they register each individual transaction, and in connection with each other, so that they show the total amount, and a cash-receiving till consisting of three separate tills—for gold, silver, and copper, respectively—each inclosing a revoluble wheel with four divisions and so arranged as to expose to sight the last coin or coins inserted therein. As the connection between the switchboard and the registering-dials is an electrical one, it will be seen that the registering-dials can be located in any place distant from the switchboard, so as to be under the direct observation of the manager or other person in authority.

By making use of a suitable system adapted to a particular trade or business in which the apparatus herein described forms an integral feature it is possible not only to prevent or minimize fraud on the part of the employees receiving cash, but to instantly tell at any moment the exact total amount received, which in many businesses is of the utmost importance.

In existing cash-checking machines or registers of any commercial value the whole of the mechanism for indicating and recording the cash receipts has been self-contained, which in many businesses necessitating the use of a great number of said registers renders them practically of little value, whereas by the present invention any number of separate switchboards located at various places throughout the building can be caused to register the cash receipts at one place.

In the accompanying drawings, which illustrate, by way of example, one method of carrying this invention into effect, Figure 1, Sheet No. 1, is a view in front elevation of the switchboard.

Throughout the views similar parts are marked with like letters of reference.

Figure 1:
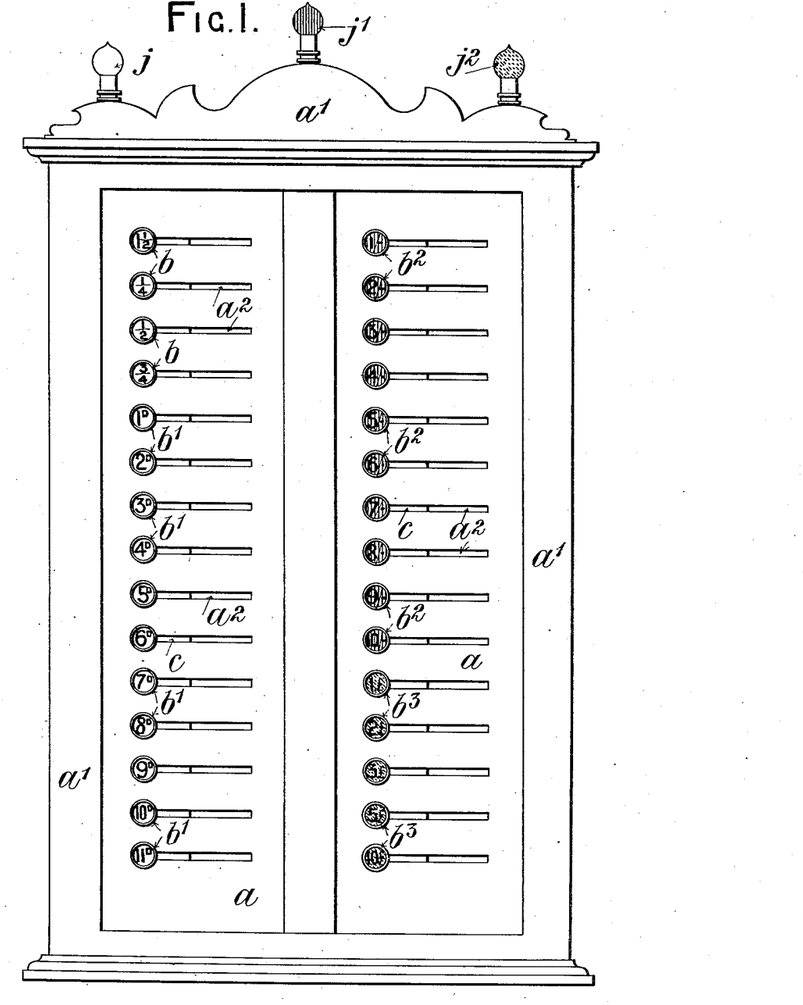
Figure 2:
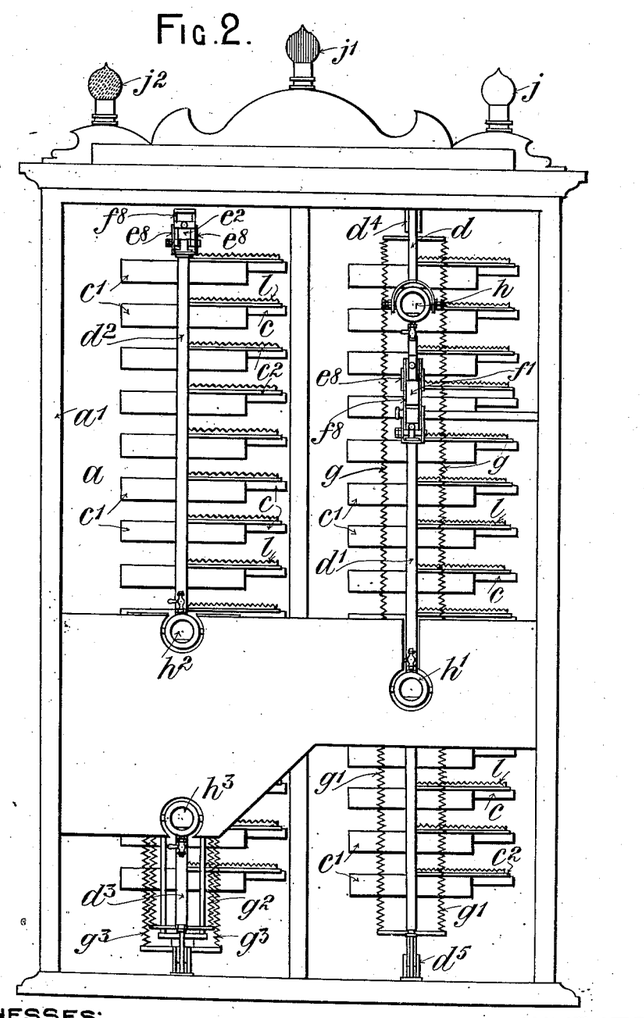
Fig. 2, Sheet No. 2, is a view in back elevation thereof.
Figure 3:
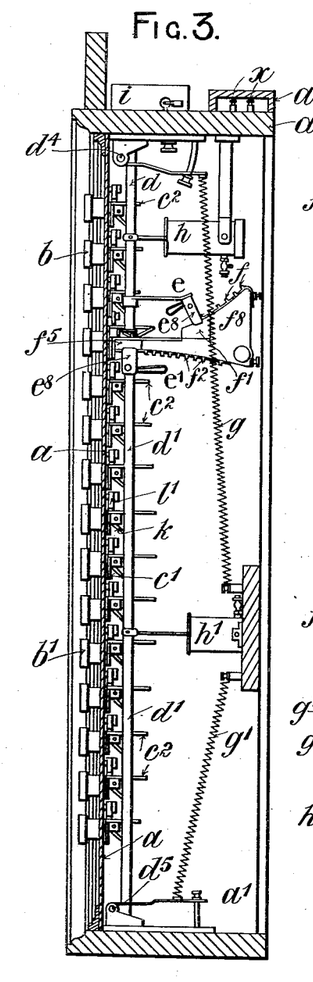
Figs. 3 and 4, Sheet No. 3, are views in side elevation thereof.
Figure 4:
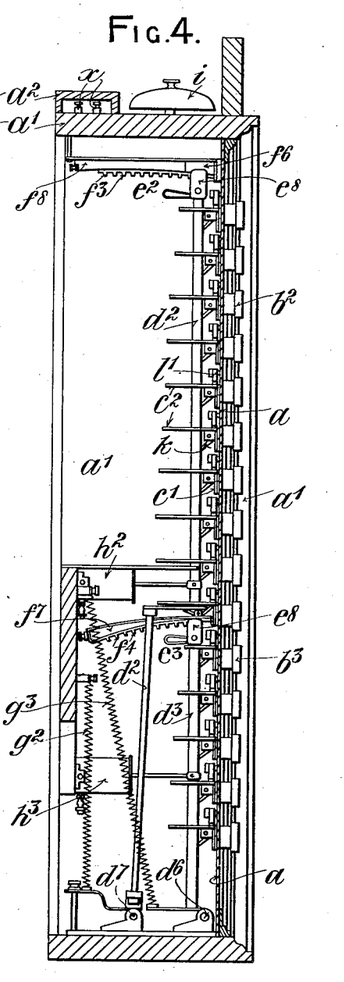
Figure 5:
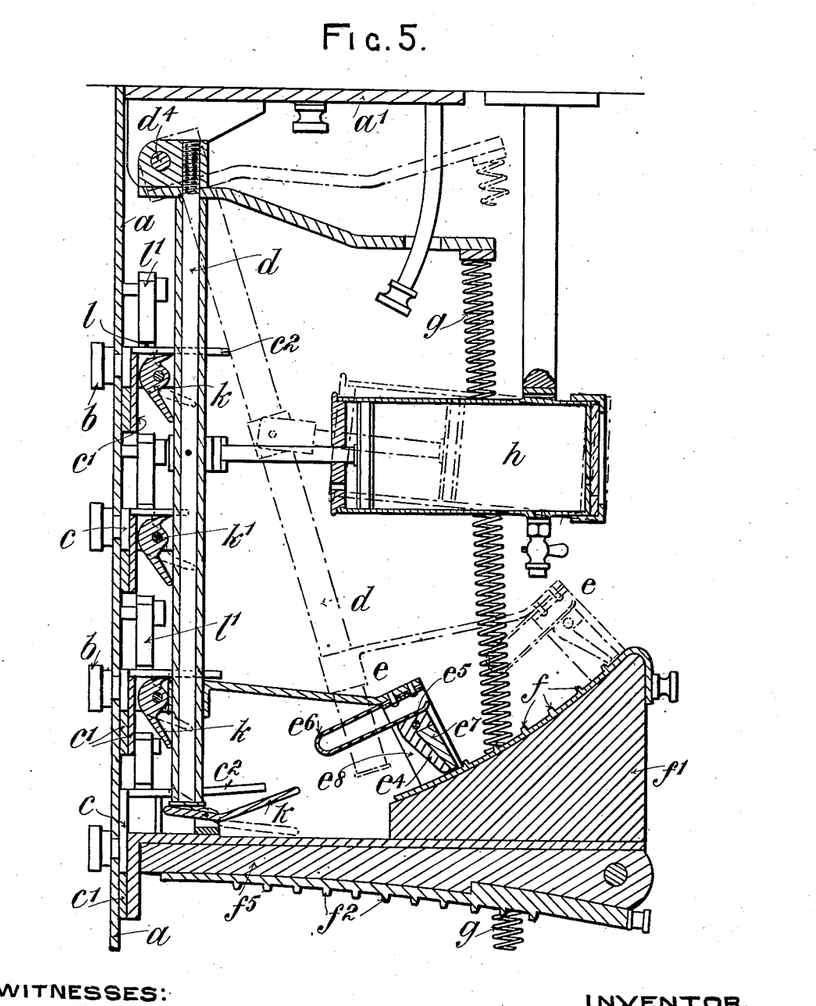
Fig. 5, Sheet No. 4, is an enlarged view in section, showing the construction of the switchboard mechanism.

The switchboard consists of a plate $a$, carried by a suitable casing $a'$, and having on its front side a series of knobs $b$, $b'$, $b^2$, and $b^3$, each one of which represents a different value and is so marked equivalent to one or more cash units. The series of knobs $b$, representing farthings, and $b'$, representing pence, are of one color, and the other series of knobs $b^2$, representing shillings, and $b^3$, representing pounds, are of other different colors, so as to render them easily distinguishable. Each of these knobs is free to slide in a slot $a^2$ in the plate $a$ and is carried by a plate $c$, sliding in guiding-pieces $c'$, fixed on the back of the said plate $a$.

The plates $c$, carrying the knobs, are provided with cam-shaped plates $c^2$, (see particularly Fig. 7;) adapted to contact with and move, when the knobs are slid in the slots $a^2$, levers $d$, $d'$, $d^2$, and $d^3$, arranged centrally behind the said plates $c^2$.

The lever $d$, adapted to be moved by the plates $c^2$, carried by the farthing series of knobs $b$, is pivoted to the casing at $d^4$ and carries at its free end a contact-piece $e$, adapted to make contact with a series of metallic teeth $f$ carried by an insulated segmental block $f'$, attached to the plate $a$ or casing $a'$. The other levers $d'$, $d^2$, and $d^3$ are pivoted at $d^5$, $d^6$, and $d^7$, respectively, to the casing and are adapted to be moved by the plates $c^2$, carried by the pence series of knobs $b'$, the shillings series of knobs $b^2$, and the pounds series of knobs $b^3$, respectively. The levers $d'$, $d^2$, and $d^3$ carry contact-pieces $e'$, $e^2$, and $e^3$, respectively, adapted to travel over different series of metallic teeth $f^2$, $f^3$, and $f^4$, carried by insulated segmental blocks $f^5$, $f^6$, and $f^7$.

Each of the contact-pieces $e$, $e'$, $e^2$, and $e^3$ consists of a metallic piece $e^4$, pivoted at $e^5$ and controlled by a spring $e^6$. The face of the piece $e^4$ is formed with an insulating material $e^7$, so that electrical contact between the piece $e^4$ and the teeth $f$ is not made on the first movement of the lever, but only on its return movement. The teeth in each series will correspond in number with the number of units represented by the highest number of the respective series of knobs. The shape of the plates $c^2$ or their distance in relation to the pivoting-points of their respective levers will determine the amount of travel which the said levers will receive on sliding the knobs either to the right or left hand, and so determine the number of teeth with which the contacts will engage.

The levers $d$, $d'$, $d^2$, and $d^3$ are held in contact with the plates $c^2$ and controlled by the springs $g$, $g'$, $g^2$, and $g^3$, respectively, and the duration of their return movements, after operation by their respective cam-plates, is controlled by dash-pots $h$, $h'$, $h^2$, and $h^3$, respectively. It will thus be seen that the speed or duration of the make-and-break in an electrical circuit between any one of the movable contacts $e$ and its contact-teeth $f$ is controllable and irrespective of the speed at which the knobs may be slid in their slots.

The levers $d$, $d'$, $d^2$, and $d^3$, besides carrying the hinged contact-pieces, are also each provided with contact-cheeks $e^8$, adapted to rub and make contact with other pieces $f^8$, carried, respectively, by the insulated blocks $f'$, $f^5$, $f^6$, and $f^7$ when the levers are operated. These contact-cheeks $e^8$ on contacting with the pieces $f^8$ complete an electrical circuit in which an electric bell $i$ or other alarm signal is included, so as to give an audible warning when any one of the series of knobs is operated. A visible warning is also given at the same moment by placing the said contacts $e^8$ and $f^8$ carried by the levers $d$ and $d'$ in circuit with an incandescent electric lamp $j$ and the contacts of the other levers $d^2$ and $d^3$ in circuit with other lamps $j'$ and $j^2$, respectively. These lamps $j$, $j'$, and $j^2$, as well as the bell $i$, are preferably carried on the top of the casing $a'$, as shown. Each of the lamps is of a different color. The lamp $j$, adapted to be lit on operating any one of the copper series of knobs, may be white, corresponding to the color of that series of knobs, and the lamps $j'$ and $j^2$, adapted to be lit on operating, respectively, any one of the silver or gold series of knobs, may be red or yellow, respectively, corresponding to the color of the respective series of knobs.

Figure 6:
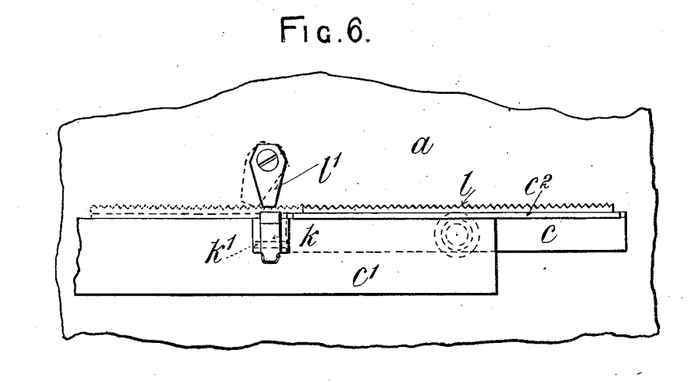
Figs. 6, 7, and 8, Sheet No. 5, are enlarged broken detail views, in back elevation, plan, and end elevation, respectively, showing the locking mechanism for each knob or slide.
Figure 7:
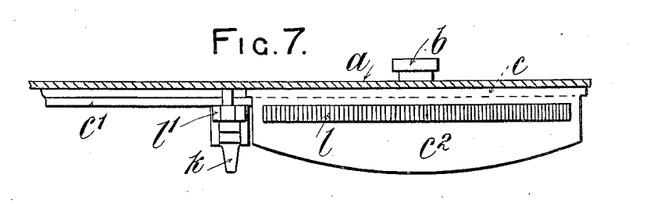
Figure 8:
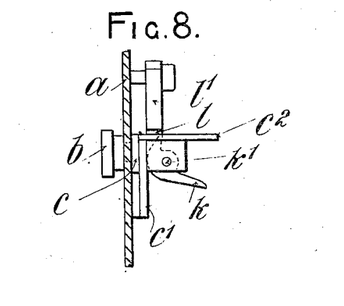

In order to prevent any knob of a series being operated until the respective lever has completed its return travel from a previous operation, the following locking device is arranged in connection with each of the cam-shaped operating-plates $c^2$. A trigger-shaped piece $k$ is pivoted at $k'$ below the edge of the plate $c^2$ and is so shaped or weighted as to cause its upper end to engage either one of the ends of the said plate $c^2$. The lower end of the said piece $k$ is adapted to be engaged by the lever when the latter is in a position of rest, and so keep the upper end of said piece from engagement with the plate $c^2$. It will thus be seen that on operating any one of the plates $c^2$ of a series immediately the lever of that series moves out of contact with the lower ends of the trigger-shaped pieces their upper ends will engage the ends of the remaining plates of that series and prevent them from being operated until the lever has completed its travel.

In order to insure that each of the plates $c'$ performs the whole of its travel after being once started or to prevent the knobs from being partly slid forward in their slots and then returned without first terminating the whole of the sliding movement in the one direction, the following locking arrangement is employed: Each of the plates $c^2$ carries on its upper side a rack $l$, with which a pivoted pawl $l'$, carried by the plate $a$ centrally with respect to said plates $c^2$, is adapted to engage during the sliding movement of the said plate, thus preventing any reverse motion of the knob and plate until the rack has passed sufficiently far in the one direction as to be clear of the pawl.

The switchboard above described is intended to be placed where it can be conveniently operated by the employees and is in electrical communication (details of the circuits will be presently described) with the recording or registering dials, which may be placed at any convenient distant part under the direct observation of the manager or proprietor.

The recording or registering dials and mechanism (see Figs. 9–14) comprise a suitable frame or casing $m$, having a wall $m'$ dividing it into two parts. On the front part of this wall are mounted the dials, and on the back thereof is carried the mechanism for operating the pointers or hands.

Figure 9:
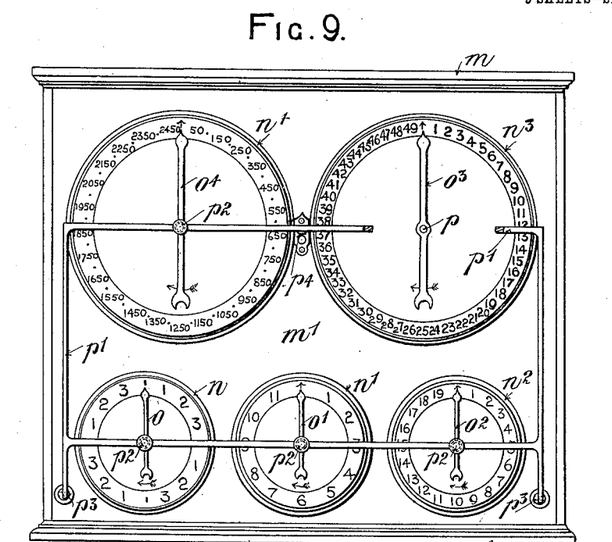
Fig. 9, Sheet No. 6, is a view in front elevation of the recording-dials.

The dials $n$, $n'$, $n^2$, and $n^3$ are for registering the farthings, pence, shillings, and pounds, respectively, and the dial $n^4$ for registering as units the maximum number of pounds which the dial $n^3$ is capable of registering. These dials may each be divided into a number of divisions found most convenient for the particular business or coinage for which the apparatus is intended to be used. In the present case the dial $n$ is divided into sixteen equal divisions for registering farthings, the dial $n'$ into twelve equal divisions for registering pence, the dial $n^2$ into twenty equal divisions for registering shillings, the dial $n^3$ into fifty equal divisions for registering pounds, and the dial $n^4$ into fifty equal divisions for registering multiples of fifty pounds.

Hands or pointers $o$, $o'$, $o^2$, $o^3$, and $o^4$ are caused to travel around their respective dials in the direction of the arrows and so record the amount. Buttons or knobs $p$ on the axles of the hands are provided for setting them at zero, and in order to prevent unauthorized setting of the hands a locking-frame $p'$ is provided. This frame is provided with collets or bosses $p^2$, fitting over the knobs $p$, and is hinged at $p^3$ to the wall or casing and locked in position so that the collets or bosses inclose the knobs $p$ by any suitable form of locking mechanism $p^4$. The actuating mechanisms of each hand or pointer may be of any suitable form of electrical step-by-step movement in electrical connection with the respective contact-teeth of the switchboard, and the mechanism for carrying forward the maximum amount of one dial to the next one of higher value may be of any well-known type, either mechanical or electrical.

A convenient method of actuating the hands and carrying forward the totals is illustrated particularly in Figs. 11–14, in which the mechanism $t^2$ for operating the shilling-dial $n^2$ is shown. On the axle $q$, carrying on its front side the hand or pointer $o^2$ and mounted in suitable bearings, is fixed a ratchet-wheel $r$, provided with twenty teeth. A rod or bar $s$ is formed in one with or fixed to the core $s'$ of a solenoid $s^2$ or electromagnet, which is capable of imparting movement to said bar. Pivoted to this bar $s$ at $r'$ is a weighted or spring-controlled pawl $r^2$, adapted to engage the teeth of said ratchet-wheel $r$ and impart motion to said wheel when the circuit of the solenoid $s^2$ is completed, causing it to suck or draw in the core $s'$, and thus move the rod or bar $s$ by making a tail $r^3$ on said pawl $r^2$ engage, and thereby be tripped by a fixed stop or guide $r^4$. Motion in the reverse or return direction is caused by a suitably-arranged spring $r^5$, engaging the said rod or bar $s$. A check-spring $r^6$, engaging the teeth of the ratchet-wheel, is provided to prevent a reverse rotation of the said wheel.

Figure 11:
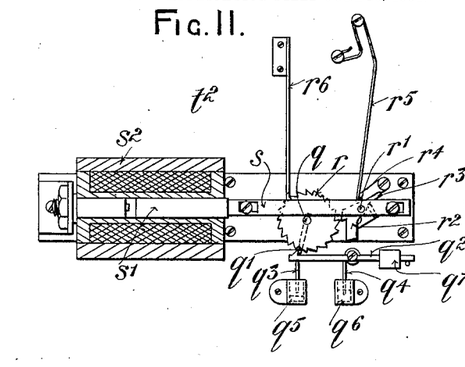
Figs. 11 and 12, Sheet No. 7, are views, on an enlarged scale, in front elevation of the mechanism for operating the hand of one of the registering-dials, showing two different positions which the parts assume.
Figure 12:
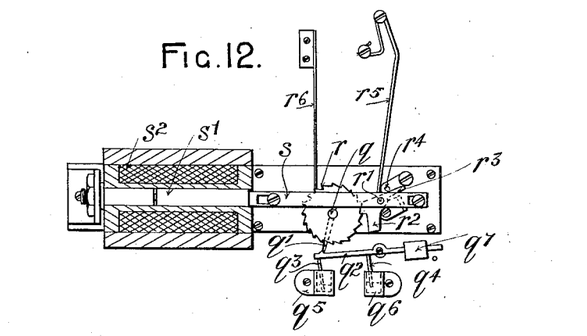
Figure 13:
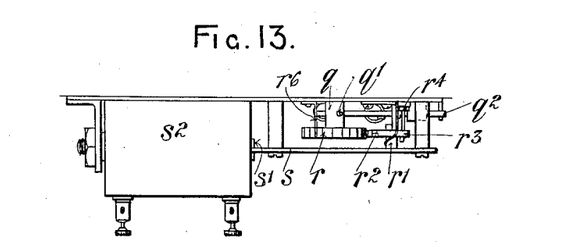
Figs. 13 and 14, Sheet No. 7, are views, also on an enlarged scale, in plan and end elevation, respectively, of the dial mechanism.
Figure 14:
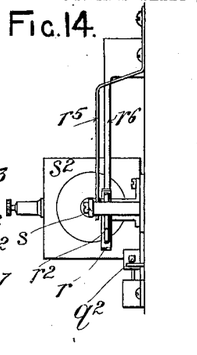

In order to make one complete revolution of the hand $o^2$ actuate the pointer $o^3$ through one division on the pounds-dial $n^3$, the axle $q$ is provided with a single tooth or projection $q'$, which is arranged to complete the circuit of the solenoid actuating the mechanism of the pound-hand $o^3$. This may conveniently be accomplished by causing the tooth $q'$ to engage the one end of a pivoted lever $q^2$, provided with contacts $q^3$ $q^4$, dipping into pots $q^5$ $q^6$, containing mercury, and which are included in the circuit of the solenoid actuating the mechanism of the hand $o^3$. The contact $q^4$ is preferably always in contact with the mercury in the pot $q^6$, while the other contact $q^5$ is arranged to only contact with the mercury in the pot $q^5$ when the lever is depressed by the tooth $q'$ against a spring or, preferably, an adjustable weight $q^7$ on the free end of said lever.

Figure 10:
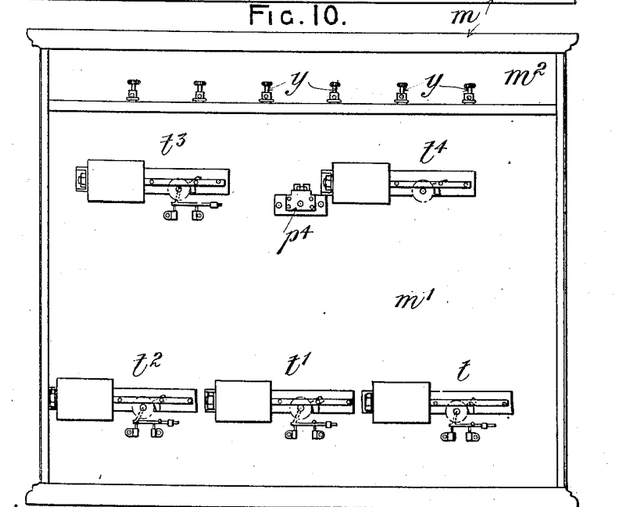
Fig. 10, Sheet No. 6, is a view in back elevation thereof.

The actuating mechanisms $t$, $t'$, $t^3$, and $t^4$ for the hands $n$, $n'$, $n^3$, and $n^4$, respectively, are similar to the one $t^2$ described above with the exception that the number of teeth of the respective ratchet-wheels correspond with the numbers of divisions of the respective dials. The carrying-forward mechanisms of the dials $n$, $n'$, and $n^3$ are similar to that described with reference to the dial $n^2$ with the exception that the axle of the hand $o$ of the farthing-dial $n$ carries four teeth $q'$ owing to the said dial registering sixteen farthings, or four pence.

Figure 15:
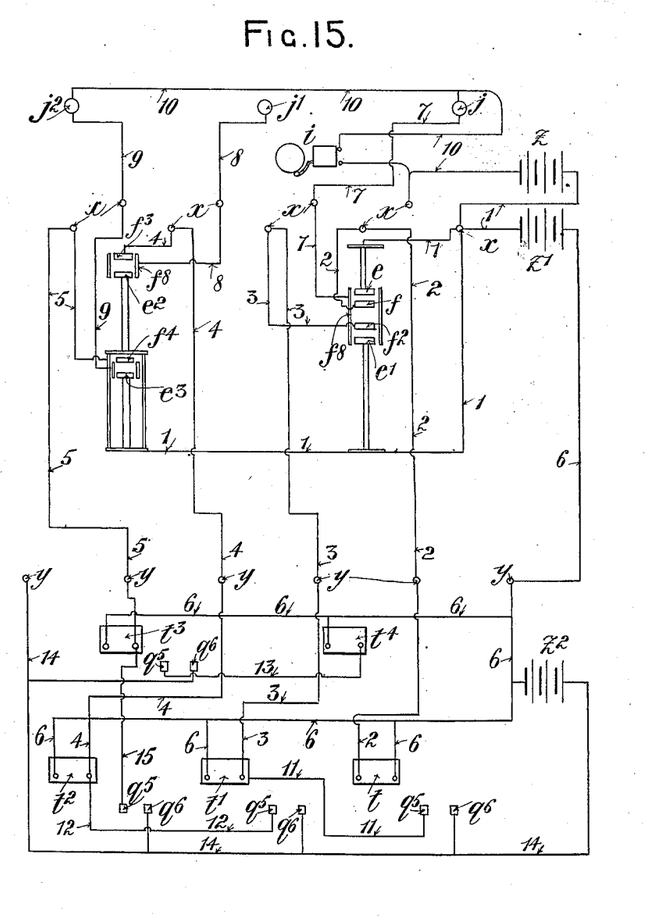
Fig. 15, Sheet No. 8, is a diagrammatic view showing the various electrical circuits and connections.

The various electrical circuits and connections (see Fig. 15) are as follows: The movable contacts $e$, $e'$, $e^2$, and $e^3$ and sliding contacts $e^8$ are all in electrical connection with one another and by wires $l$ in connection with the poles of two batteries $z$ and $z'$. The teeth $f$, $f^2$, $f^3$, and $f^4$, or contacts for the farthing series of knobs $b$, pence-knobs $b'$, shilling-knobs $b^2$, and pound-knobs $b^3$, respectively, are connected to the one terminal of the solenoids of the actuating mechanisms $t$, $t'$, $t^2$, and $t^3$, respectively, by wires 2, 3, 4, and 5. The other terminals of the solenoids of the said mechanisms $t$, $t'$, $t^2$, and $t^3$ are connected by wires 6 to the other pole of the battery $z'$ and to the one pole of another battery $z^2$. The contacts $f^8$, with which the pieces $e^8$ contact on operating any one of the copper series of knobs $b$ $b'$, the silver series of knobs $b^2$, and the gold series of knobs $b^3$, are connected, respectively, with the one terminal of the lamps $j$, $j'$, and $j^2$ by wires 7 8 9. The other terminals of the lamps are connected by wires 10 with the other pole of the battery Z, in which return-circuit is included the bell $i$. The bell $i$ is of the single-stroke type, working without interruption of the circuit. The mercury-contact pots $q^5$ of the actuating mechanisms $t, t', t^2$, and $t^3$ are connected, respectively, to the solenoids of the mechanisms $t', t^2, t^3$, and $t^4$ by wires 11, 12, 15, and 13, and in the case of the solenoids of the mechanisms $t', t^2$, and $t^3$ to those terminals with which the wires 3, 4, and 5 are connected, the free terminal of the solenoid of the mechanisms $t^4$ being connected to the return-circuit wire 6. The other mercury-contact pots $q^6$ are connected with the other pole of the battery $z^2$ by wires 14. The various wires of the switchboard are connected to the terminals $x$ $x$ on the top of the casing $a'$ and are preferably inclosed by a removable casing $a^2$. The terminals $y$ $y$ of the various wires of the recording-dials are contained within a separate compartment $m^2$, formed on the back upper part of the casing $m$ and to which access may be obtained without removing the back board covering in the actuating mechanisms of said dials.

The machine operates as follows: On the supposition that a cash payment of one and one-half pence has been made the first knob of the series $b$ is slid from the left to the right hand, or vice versa, should the knob happen to be on the right-hand side. This motion when half completed will cause the lever $d$, owing to the cam-shaped plate $c^2$ engaging therewith, to assume the position indicated in dot-and-dash line in Fig. 5. This movement of the lever having brought the contacts $e^8$ and $f^8$ into engagement, the lamp $j$ will glow and the bell sound, calling attention to the fact that the machine has been operated. On this first movement of the lever the contact-piece $e^4$ will pass above the teeth $f$ without making contact therewith, owing to the insulated piece $e^7$ engaging said teeth, but on its return movement the piece $e^4$ contacts with the last tooth making contact therewith, then passing out of contact again breaks the circuit before contacting with the next tooth, and so on, thus producing six, in the present instance, distinct makes and breaks in the circuit before the lever comes again to rest. Each of these interruptions causes the solenoid of the actuating mechanism $t$ to operate, thus rotating the ratchet-wheel and driving it forward six teeth, one tooth at a time. The hand $o$ of the dial $n$ will then indicate 2 on the second quarter of the dial, equivalent to six farthings, and the hand $o'$ of the dial $n'$ will be at "1" thereon, because after the fourth tooth of the ratchet-wheel was engaged the tooth $q'$ on the spindle thereof came into engagement and depressed the mercury contact-lever, thereby causing the solenoid of the actuating mechanism $t'$ to rotate the hand $o'$ through one of the divisions on the dial $n'$. It will thus be seen that the hands will then register "2" on the farthings-dial and "1" on the pence-dial, equivalent to one and one-half pence, corresponding to the amount denoted on the knob operated. The lamp $j$ will continue to glow, owing to the contacts $e^8$ and $f^8$ remaining in engagement, until the dials have recorded the amount, so giving notice that any knob of the series controlling said lamp is free to be again operated.

The cash-receiving till, which is illustrated in Figs. 16 to 19 of the accompanying drawings, consists, essentially, of a vertically-arranged casing $u$, having a drawer $u'$ arranged at its lower end and carrying at its upper part a semicircular casing $u^2$. The casing $u$ is adapted to be secured to the edge of the counter or other convenient place in such a manner that only the casing $u^2$ projects above the surface of said counter. The sides $u^3$ of the semicircular casing $u^2$ are formed of any suitable transparent material, preferably glass. The casing $u^2$ is arranged so as to be readily detached from the casing $u$ in order to allow of the transparent sides $u^3$ being cleaned inside and also to allow of their being replaced in case of breakage. A convenient arrangement is to form the said casing $u^2$ with spring-arms $u^4$, adapted to slide down the inner sides of the casing $u$ and to be retained in position by engaging studs $u^5$, fixed to the sides of the casing $u$. In order to release the arms $u^4$ from engagement with the studs $u^5$, access is obtained to the interior of the casing by means of the drawer $u'$, which is provided with any suitable locking device. A revoluble wheel having four divisions is adapted to be rotated within the casing $u^2$ and partly within the casing $u$. This wheel preferably takes the form of four equally-spaced radial members $w$, each of which is of a like length and of a triangular shape in cross-section, having an axle $w'$ mounted to revolve in bearings formed in the casing $u$. On the axle $w'$ is fixed a ratchet-wheel $w^2$, having four teeth corresponding to the members $w$ and with which engages a spring-controlled pawl $w^3$, carried by a bevel-pinion $w^4$, loosely mounted on said axle. The bevel-pinion $w^4$ is adapted to gear with a similar pinion $w^5$, carried by a transverse axle $w^{13}$, mounted in bearings on the casing $u$. Attached to or in one with the pinion $w^5$ is an operating arm or lever $w^6$, controlled by a spring $w^{12}$ and having the rocking movement necessary to impart a quarter-revolution to the axle $w'$ defined by suitably-arranged stops. On the lever $w^6$ is carried a finger-piece $w^7$ for manipulating the said lever.

Figures 16, 18:
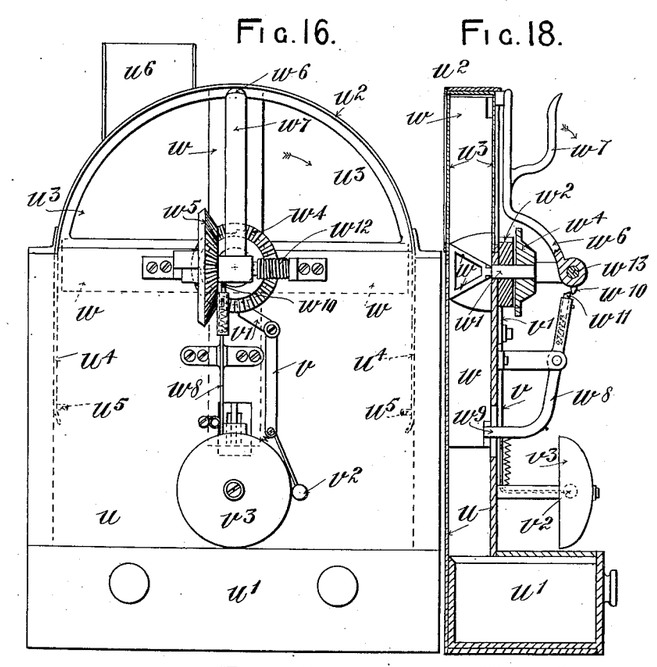
Fig. 16, Sheet No. 9, is a view in front elevation of one of my improved tills.
Fig. 18, Sheet No. 9, is a view in end elevation thereof, partly in section.
Figures 17, 19, 20:
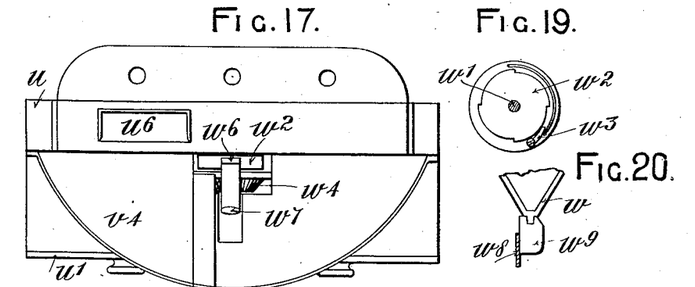
Fig. 17, Sheet No. 9, is a view in plan thereof.
Figs. 19 and 20 are detail views of the till mechanism.

The various parts are so arranged in relation to each other that on operating the lever $w^5$ the axle $w'$, carrying the members $w$, is rotated one quarter of a revolution, and the said members when at rest are always in the position shown, so that the upper casing $u^2$ is divided into two compartments, into one of which the cash is inserted through a slot $u^6$ and falls onto that member, which for the time being forms a bottom to said compartment. On operating the lever the cash will then be transferred to the other compartment by reason of that member formerly lying in a horizontal plane, assuming a vertical position and forming the central division-wall of the compartments.

In order to lock the members $w$ in their respective positions after movement a double-armed spring-controlled lever $w^8$, pivoted to the casing $u$, carries at its lower end a fork or notched piece $w^9$, which is beveled or so shaped as to allow the members engaging therewith when rotating in the direction indicated by the arrow, but not to be moved out of engagement until the lever $w^8$ is operated to withdraw the said piece $w^9$ out of engagement, which is accomplished by forming on the boss of the lever $w^6$ a pin $w^{10}$, adapted to engage the end of a spring-controlled bolt $w^{11}$, carried by the free end of the lever $w^8$.

The meeting faces both of the pin $w^{10}$ and the bolt $w^{11}$ are so beveled or shaped as to allow the lever $w^8$ only being operated on the forward or operative movement of the lever $w^6$ and not on its return movement, which is effected by the spring $w^{12}$. In order to call attention to the fact of the till being operated a bell is sounded each time the lever $w^6$ is manipulated by pivoting a double-armed spring-controlled lever $v$ to the casing $u$ in such a position that its one end $v'$ is in contact with the ratchet-teeth of the wheel $w^2$ and is adapted to receive movement therefrom. The free end of said lever $v$ is formed as a hammer $v^2$, adapted to strike a bell $v^3$. The bell and other mechanism are inclosed by a suitable casing $v^4$.

The till is operated as follows: The cash received is inserted through the slot $u^6$. The lever $w^6$ is then pulled in the direction of the arrow by means of the finger-piece $w^7$, thereby imparting motion to the bevel-wheels and causing the axle to be rotated, owing to the pawl $w^3$ being in engagement with one of the teeth of the ratchet-wheel $w^2$. At the first forward movement of the lever $w^6$ the notched piece $w^9$ is withdrawn from engagement, and so allows the members $w$ to be rotated. At the termination of the travel of the lever $w^6$ the bell $v^3$ is sounded. The money will then be visible in the second compartment until the lever is again operated, when it will fall into the drawer $u'$. On releasing the finger $w^7$ the lever $w^6$ will return by the action of its spring $w^{12}$, the pawl $w^3$ overriding the teeth of the ratchet-wheel, so that no motion will be imparted to the axle $w'$, and consequently the members $w$ will not be moved.

What I claim, and desire to secure by Letters Patent of the United States, is—

1. An electrical cash-checking machine consisting of a switchboard having a series of sliding knobs, each one of which represents a different value equivalent to one or more cash units, a plurality of contacts equivalent in number with the number of units represented on the knob having the highest value, a sliding contact adapted to pass over said contacts and make and break circuit on the return movement, means whereby the sliding knobs are caused to operate the sliding contact so as to cause the number of contacts engaged to correspond with the number of units represented on the knob operated and a dial in electrical connection with the said contacts so arranged as to register each operation of the switchboard, as set forth.

2. An electrical cash-checking machine consisting of a switchboard having a series of sliding knobs, each one of which represents a different value equivalent to one or more cash units, a plurality of contacts equivalent in number with the number of units represented on the knob having the highest number, a sliding contact adapted to pass over said contacts and make and break circuit on the return movement, a movable rod carrying said sliding contact, a series of cam-shaped pieces carried by said knobs and adapted to move said rod on sliding the knobs, the amount of movement of said rod varying with each cam-shaped piece so as to cause the number of contacts engaged by the sliding contact to correspond with the number of units represented on the knob operated, and a dial in electrical connection with the said contacts so arranged as to register each operation of the switchboard, as set forth.

3. An electrical cash-checking machine consisting of a switchboard having a series of sliding knobs, each one of which represents a different value equivalent to one or more cash units, a series of contacts one for each denomination of cash units represented by the different series of knobs, each contact comprising a plurality of contacts equivalent in number with the number of units represented on the knob having the highest number of units in its respective denomination, a sliding contact for each denominational contact adapted to pass over the contacts of its series and make and break circuit on its return movement, a movable rod carrying said sliding contact, a series of cam-shaped pieces carried by the sliding knobs and adapted to move said rod on sliding the respective knobs, the amount of movement of said rod varying with each cam-shaped piece so as to cause the number of contacts engaged by the sliding contact to correspond with the number of units represented on the knob operated, and a series of dials in electrical connection with the said contacts so arranged as to register each operation of the switchboard, as set forth.

4. An electrical cash-checking machine consisting of a switchboard having a series of sliding knobs, each one of which represents a different value equivalent to one or more cash units, a series of contacts one for each denomination of cash units represented by the different series of knobs, each contact comprising a plurality of contacts equivalent in number with the number of units represented on the knob having the highest number of units in its respective denomination, a sliding contact for each denominational contact adapted to pass over the contacts of its series and make and break circuit on its return movement, a movable rod carrying said sliding contact, a series of cam-shaped pieces carried by the sliding knobs and adapted to move said rod on sliding the respective knobs, the amount of movement of said rod varying with each cam-shaped piece so as to cause the number of contacts engaged by the sliding contact to correspond with the number of units represented on the knob operated, a series of dials in electrical connection with the said contacts so arranged as to register each operation of the switchboard, and of mechanism connecting the series of dials together so as to register the total operation of the switchboard, as set forth.

5. An electrical cash-checking machine consisting of a switchboard having a series of sliding knobs, each one of which represents a different value equivalent to one or more cash units, a series of contacts one for each denomination of cash units represented by the different series of knobs, each contact comprising a plurality of contacts equivalent in number with the number of units represented on the knob having the highest number of units in its respective denomination, a sliding contact for each denominational contact adapted to pass over the contacts of its series and make and break circuit on its return movement, a movable rod carrying said sliding contact, a series of cam-shaped pieces carried by the sliding knobs and adapted to move said rod on sliding the respective knobs, the amount of movement of said rod varying with each cam-shaped piece so as to cause the number of contacts engaged by the sliding contact to correspond with the number of units represented on the knob operated, means whereby the interruption in the electrical circuit or circuits—corresponding to the unit or units represented by the knob operated—cause an electrical step-by-step movement or movements included in said circuit or circuits to register such unit or units on one or more of a series of dials, of contacts so arranged in connection with the mechanism of said dials as to come into operation and carry forward the totals of each dial to the next one registering units of a higher value, as set forth.

6. An electrical cash-checking machine consisting of a switchboard having a series of sliding knobs, each one of which represents a different value equivalent to one or more cash units, a series of contacts one for each denomination of cash units represented by the different series of knobs, each contact comprising a plurality of contacts equivalent in number with the number of units represented on the knob having the highest number of units in its respective denomination, a sliding contact for each denominational contact adapted to pass over the contacts of its series and make and break circuit on its return movement, a movable rod carrying said sliding contact, a series of cam-shaped pieces carried by the sliding knobs and adapted to move said rod on sliding the respective knobs, the amount of movement of said rod varying with each cam-shaped piece so as to cause the number of contacts engaged by the sliding contact to correspond with the number of units represented on the knob operated, means whereby the interruption in the electrical circuit or circuits—corresponding to the unit or units represented on the knob operated—cause an electrical step-by-step movement or movements included in said circuit or circuits to register such unit or units on one or more of a series of dials, of contacts so arranged in connection with the mechanism of said dials as to come into operation and carry forward the totals of each dial to the next one registering units of a higher value, of a bell or other audible signal adapted to be sounded on operating any one of the knobs on the switchboard, and of one or more incandescent electric lamps located on or near said switchboard and which are caused to glow on operating any one of the said knobs and to continue glowing until the unit or units represented by said operated knob has or have been registered on the respective dial, as set forth.

7. An electrical cash-checking machine consisting of a switchboard having a series of sliding knobs, each one of which represents a different value equivalent to one or more cash units, a plurality of contacts equivalent in number with the number of units represented on the knob having the highest value, a sliding contact adapted to pass over said contacts and make and break circuit on the return movement, means whereby the sliding knobs are caused to operate the sliding contact so as to cause the number of contacts engaged to correspond with the number of units represented on the knob operated and a dial in electrical connection with the said contacts so arranged as to register each operation of the switchboard in combination with a till consisting of a casing having its sides of transparent material, of a revoluble wheel having four divisions mounted within said casing, of an axle carrying said wheel, of mechanism actuating said axle through one quarter-revolution, of a trigger connected with and operating said actuating mechanism, of a bell carried by said casing, and of mechanism for sounding said bell on operating the said trigger, as set forth.

EDGAR GUESS.

Witnesses:
A. MILLWARD FLACK,
G. V. SYMES.